United States Patent Office 3,514,568
Patented May 26, 1970

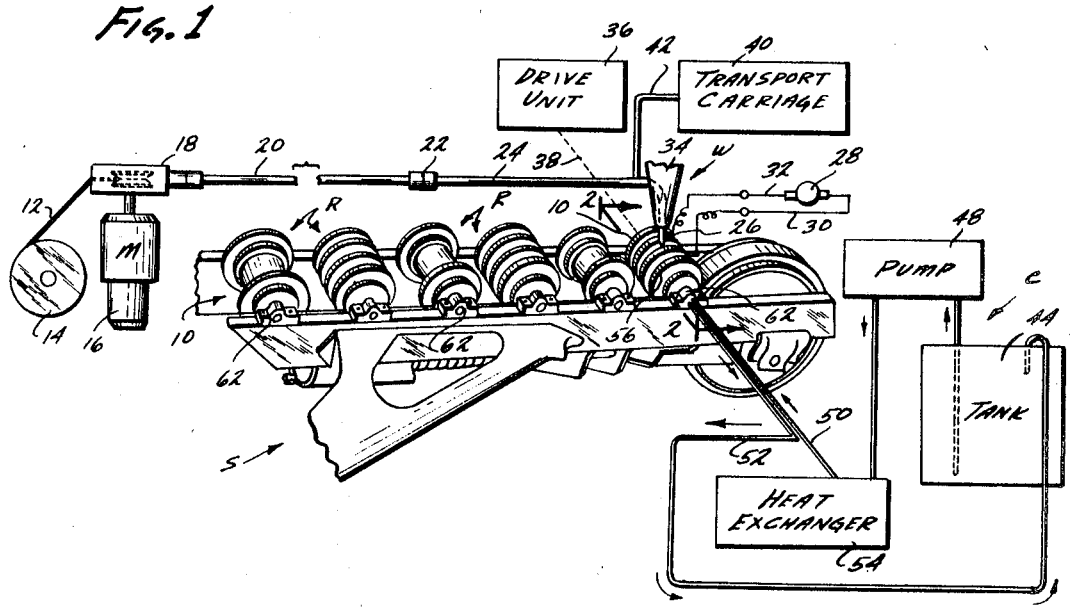
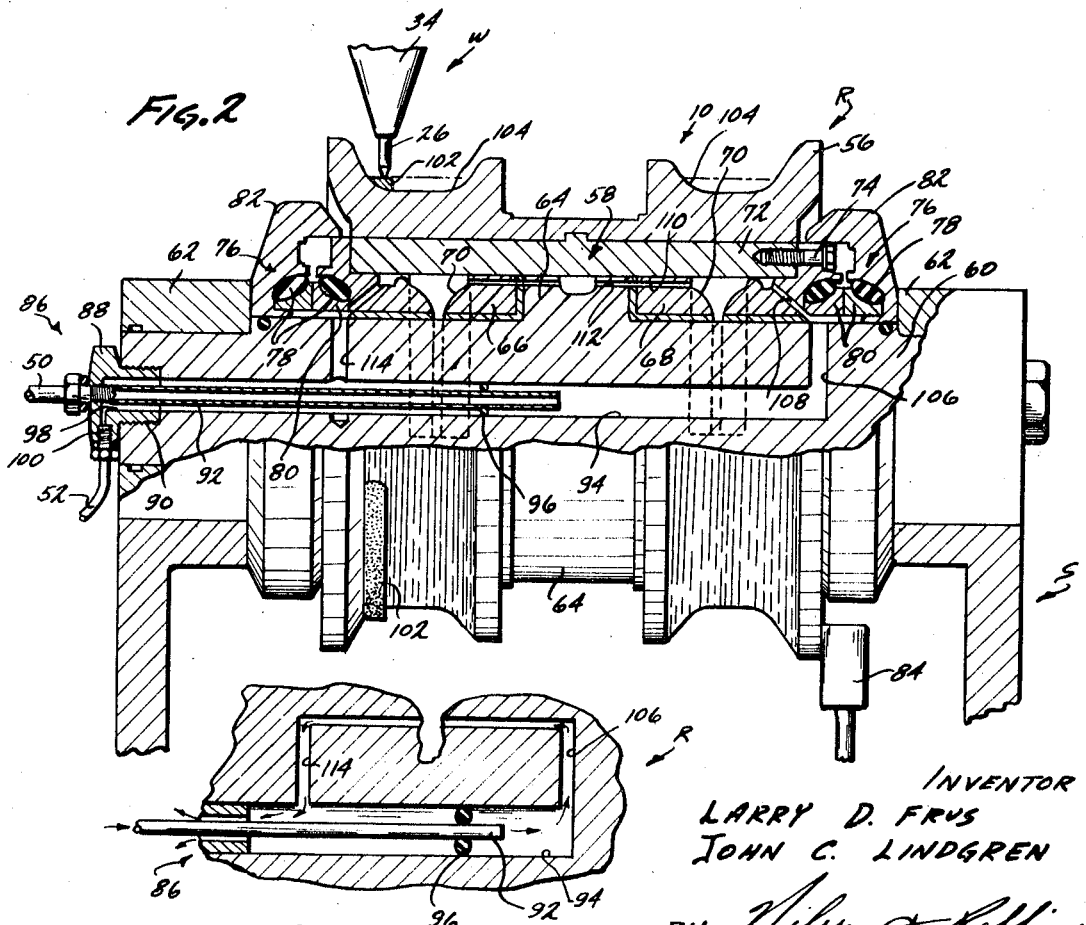

3,514,568
METAL BUILD-UP SYSTEM
Larry D. Frus and John C. Lindgren, Whittier, Calif., assignors to Stoody Company, a corporation of California
Filed Sept. 20, 1967, Ser. No. 669,228
Int. Cl. B23k 9/04
U.S. Cl. 219—76                 10 Claims

ABSTRACT OF THE DISCLOSURE

A system for depositing build-up metal on a workpiece (as a worn machine element) is disclosed. The workpiece, in the form of a rotary element is re-built and hard-faced, by arc welding, without dis-assembly. Liquid coolant is circulated between the interior structure of the workpiece and its rim, then simultaneously, the rim of the workpiece is revolved in synchronism with the deposition of metal by arc welding. The fluid coolant is introduced into the rotary workpiece, and removed therefrom through a concentric, dual-passage structure connecting the interior of the workpiece to an external circulation system including a low-pressure pump and a heat exchanger. The disclosed welding apparatus also includes means for supplying a continuous length of welding wire to a submerged arc.

Background and summary of the invention

Over a substantial number of years, the practice of applying hard, surface metal by welding, to re-build various machine components has steadily increased. As a result, it is now common practice to re-build various machines (as tractors) thereby accomplishing the near-equivalent of a new machine. Pursuing the example of a tractor, prior practice has been to completely dis-assemble the entire machine, clean and prepare the individual parts, weld hard build-up metal onto certain of the worn parts, which are then re-sized and re-assembled. Track rollers (for engaging the track) may be considered somewhat exemplary of the component re-build operation.

Track rollers conventionally include an external rim which directly engages the track, and which is supported by an internal structure that affords a bearing surface for the rim. Usually, lubricant-containing spaces are defined between the internal structure and the rim, which spaces are sealed closed resulting in a structure that can withstand very extensive use. In this regard, normally, the roller rims require re-building at a time long prior to the time when the internal structure requires maintenance service. However, in spite of the good condition of the interior, prior practice usually has involved complete dis-assembly of the roller in order to re-build the rim. Specifically, the rollers are first dis-assembled and the parts are cleaned. Next, the worn surfaces of the roller rims are prepared to receive build-up metal, which is then applied by various welding techniques. During the course of applying the build-up metal, the roller rim normally reaches elevated temperatures causing some permanent distortion and shrinkage. Therefore, after the build-up operation is completed, the roller rims are re-bored or slugged to resize the bore to original dimensions to or otherwise re-establish the original dimensions and assure that the axial bore is perfectly round. The rollers are then re-assembled and filled with lubricant preparatory to integration in a sub-assembly which is replaced on the tractor.

It is evident, that a considerable portion of the cost of re-building a machine, as a tractor is involved with dis-assembling and re-assembling the component parts. This consideration is particulary true when the component parts must be re-sized as in the case of rollers. Of course, the direct application of build-up metal onto an assembled roller, as by welding, would almost invariably elevate the temperature of the entire roller to a destructive level.

One prior technique for avoiding heat distortion in a roller during build-up operations involves placing the roller in a water bath to maintain it at a lower temperature. If the technique is successful, the rim, as well as the other parts of the roller are not distorted by the heat of welding resulting in a considerable saving of time and effort. However, certain other difficulties are attendant this technique. Specifically, it is difficult if not impossible to apply the metal in continuous operations. That is, the roller rim must be built-up, one section at a time as by a series of transverse beads. As a result, by this technique, it is sometimes difficult to maintain the surface of the build-up metal truly cylindrical.

Another difficulty in using an immersion bath stems from the arc encountering wet areas on the workpiece, to produce hydrogen, which causes pin holes to be formed. Also, with this technique, temperature differentials still may develop within the roller resulting in intolerable distortion and thereby necessitating complete dis-assembly of the roller and re-sizing.

Still another difficulty attendant this technique is that submerged arc welding may not be practical. If granular flux is dispensed to submerge the arc, the flux usually falls into the water bath, becomes wet and cannot be used again. As a result, the loss of such flux imposes a substantial economic penalty on employment of submerged-arc welding techniques when the workpiece is cooled in a water bath.

Recapitulating, over a substantial number of years during which tractor rollers and numerous other elements have been commonly re-built by welding, individual elements have either been totally dis-assembled and re-sized or cooling baths have been employed during re-build of assembled rollers, at little or no economic advantage.

The present invention provides a process and an apparatus whereby rotary components of a machine sub-assembly may be built-up and hard-faced without removal from the sub-assembly (or dis-assembly, and without substantial threat of permanent distortion. This invention stems from the discovery that fluid coolant can be continuously circulated through the lubricating passages of a rotary machine component, concurrently with the machine-controlled deposition of build-up metal by arc-welding thereto (submerged, open, gas shielded and so on), whereby to preserve the workpiece below the critical temperature. As a specific example, tractor rollers, including an internal structure and a cooperating external rim, may be re-built with the deposition of metal by welding, on the rim, while fluid coolant is continuously circulated through the lubricating passages defined between the rim and the internal structure.

The apparatus of the present invention further includes a concentric, dual-passage structure for circulating coolant through a rotary machine element with access through only one port. Furthermore, the system hereof contemplates circulation of the fluid at a relatively low pressure and the utilization of particular fluids as a coolant.

Brief description of the drawings

In the drawing, which constitutes a part of this specification, an exemplary embodiment demonstrating various objects in the features hereof is set forth as follows:

FIG. 1 is a perspective and diagrammatic view of an apparatus for re-building machine elements in accordance with the principles of the present invention;

FIG. 2 is an enlarged partial section view taken vertically along line 2—2 of FIG. 1; and FIG. 3 is a schematic diagram representative of the fluid flow pattern of FIG. 1.

Description of the illustrative embodiment

Referring initially to FIG. 1, there is shown a tractor sub-assembly S, undergoing re-build by a system illustrative of the present invention. The sub-assembly S is a common and widely-used machine structure including a plurality of rollers 10 for supporting a portion of one track of a tractor. The sub-assembly as disclosed herein is merely representative of applications for the present invention, the individual rollers 10 being disclosed as exemplary workpieces which are re-built by depositing hard metal on the rims thereof.

In general, during re-build the sub-assembly S is rigidly mounted on a support (not shown) so that the individual rollers 10 are readily accessible as shown. In accordance with the illustrative embodiment, the rollers are then re-built, one (or more) at a time by an arc welding apparatus W while a liquid coolant is circulated through the roller in process, by a cooling system C. In this manner, each of the rollers R may be re-built without removal from the sub-assembly S thereby greatly reducing the cost of re-build.

Considering the system hereof in greater detail, FIG. 1 illustrates the re-building of one of the rollers R specifically, the roller 10. The build-up is accomplished by the deposition of weld wire 12 (extreme right) drawn from a reel 14 by a motor 16 which drives a pulley mechanism 18 that engages the wire. Of course, various forms for the mechanism 18 are well known in the prior art which are satisfactory to accomplish the function of transporting the wire 12 through a conduit and then to the workpiece 20.

The conduit 20 terminates at a universal joint 22 which is in turn coupled to a flexible delivery tube 24 extending to carry the wire 12 to a location contiguous the roller 10. At the roller 10, the wire is fed to an electric arc through a guide 26 which also supplies electrical energy from a power source, as a rectifier, or as here shown, a generator 28 for producing the arc. A wide variety of arc welding guides for wire incorporating electrical connections to the wire are very well known in the prior art. Therefore, in FIG. 1, the generator 28 is merely schematically indicated to be connected to the sub-assembly S through a conductor 30 and to the guide 26 through a conductor 32.

The welding arc that is sustained by electrical energy from the generator 28 is maintained submerged by pulverized or granular flux which is dispensed over the arc from a conical nozzle 34. Again, various granular flux dispensers may be utilized as the nozzle 34 and related structure, as are very well known in the prior art and as are currently in widespread use. Also, the arc may be open, gas shielded or otherwise as known in the art, and of course, a plurality of arcs may also be employed.

Concurrently with the deposition of metal on the roller 10 by the welding apparatus W, the rim of the roller 10 is rotated by a drive unit 36. The drive unit 36 is schematically shown in FIG. 1; however, the unit may comprise a small motor with an integrated gear box, coupled to the rim of the roller 10 by a friction capstan (as indicated by dashed line 38). As the rim of the roller 10 is turned, the tube 24 along with the nozzle 34 and the guide 26, is slowly moved transverse to the roller 10 by a transport carriage 40 that is connected to the tube 24 by an arm 42. The transport carriage 40 may comprise any of a great variety of well-known mechanisms including a gear and rack, for linearly moving the arm 42 at a slow rate of travel. Of course, this motion is accommodated by the universal joint 22 and in cooperation with the rotary motion of the roller 10 causes the build-up metal to develop a bead in the form of a plurality of loops, e.g. a tightly-closed spiral or several rings. Thus, a layer of metal is precisely deposited in the form of a cylindrical shell upon the exterior rim of the roller 10. Additionally the pattern may take other forms as transverse beads or the like.

As indicated above, the roller 10 generally includes an internal structure which affords bearing surfaces for an external structure, generally referred to herein as the rim. Lubricating cavities are defined between these structures and in accordance with conventional practice, such cavities are filled with lubricating fluid which affords the internal components of the roller an exceedingly long life. Also, somewhat conventionally, access to the inner cavities of the roller 10 is provided through a single port extending axially into the roller and branching through radial ducts to the bearing surfaces. In accordance with the system hereof, lubricating fluid is cycled through such a port at a relatively low pressure to preserve the roller 10 below a critical or damaging temperature.

Considering the fluid cooling system C in greater detail, a reservoir of fluid is contained in a tank 44, to be drawn therefrom by a pump 48 and injected into the roller 10 through an intake line 50 and a heat exchanger 54. A return line 52 then carries fluid from the roller 10 and is coupled back to the tank 44. As will be described in detail below the intake line 50 and the exhaust line 52 are afforded entry into the roller 10 through a pair of concentric or telescopic passages. Additionally, a flow-control guide (described below) is necessary to assure that the coolant flows completely through the roller 10. The details of such structure are shown in FIG. 2, and schematically represented in FIG. 3, both of which, previously-identified elements carry reference numerals as identified with reference to FIG. 1.

The roller 10 as shown in FIG. 2 includes a unitary external rim 56 borne on a somewhat complex internal structure 58, comprising a plurality of assembled component parts. The entire structure 58 is supportably carried on an axle 60 which is affixed in yokes 62 for integration with the sub-assembly S. The structure shown herein is somewhat representative of a wide variety of rotary machine components. In this regard, the specific detailed structures may be variously fixed together and include a widely-different variety and form of components. Thus, the roller 10 is merely exemplary of an application of the system hereof and in this regard is somewhat typical of rollers R that are in widespread use.

The axle 60 in the roller 10 includes a central flange 64 which divides the internal structure into separate, somewhat symmetrical halves. Specifically, bearings 66 and 68 receive the axle 60 on either side of the flange 64. It is to be noted, that the bearings include arcuate radial openings 70 spaced about their periphery and additionally are ported to accommodate a movement of lubricant. Mating the bearings 66 and 68 to the rim 56 is a bushing cylinder 72 which is concentric to the axle 60 and which is affixed between the bearings 66 and 68 by studs 74.

During the normal use of the roller 10, the bearings 66 and 68 are lubricated by a quantity of oil which is sealed in the roller 10. Specifically, the oil occupies internal spaces as the openings 70 along with certain flow ports as described in detail below. The oil-containing chambers of the roller 10 are sealed closed by end seals 76 each of which include a pair of non-metallic rings 78 that are resiliently deformed to maintain metal rings 80 in sealing relationship with surfaces internal thereof. In this regard, the non-metallic rings, which may take the form of rubber or rubber-like materials, are held in place by annular hubs 82 closing the roller structure.

In view of the above general description of the system hereof, and the description of an exemplary roller structure as well known in the prior art, a complete understanding of the system hereof may now best be accomplished by explaining the concurrent operations of the present system, with respect to the roller 10 and introducing additional elements of the system as the explanation progresses. Therefore, assume initially that the roller 10 has been mounted substantially as shown in FIG. 1, and that the weld-wire guide 26 along with the nozzle 34 are positioned for operation. Additionally, a capstan 84 (lower right, FIG. 2) frictionally engages the rim 56 and is connected to drive unit 36 (FIG. 1) so as to turn the rim 56 at a controlled rate.

In addition to these active engagements with the roller 10, the coolant-circulating structure 86 couples the cooling system C (FIG. 1) to the interior passages of the roller 10. Specifically, the intake line 50 (FIG. 2) from the cooling system passes axially through a head coupling 88 which is threadably received in a port 90 (for filling the roller with lubricant) normally closed by a plug (not shown). The head structure 86 couples the line 50 to an inlet tube 92 extending axially into a central bore 94 in the axle 60. The tube 92 carries a seal 96, which may comprise a contained O-ring, for providing a seal between the exterior of the tube 92 and the interior of the bore 94. Additionally, the head structure 86 defines an exterior passage 98 which is concentric about the tube 92 and which passage is connected through a radial bore 100 to the exhaust line 52.

Considering the operation of the system with reference to FIG. 2, as the capstan 84 revolves the rim 10, a welding arc is established between the wire that is dispensed from the guide 26 and the surface of the rim 10. The bead 102 that is deposited on the worn surface 104 of the rim 10 rebuilds that surface with hard metal preparatory to another extended period of use. As explained above, in the illustrative embodiment, the bead 102 is formed for example, either as a closed spiral or a stock of rings, and so on, by the cooperative motion of the rim 56 and the guide 26.

As the bead 102 is deposited, substantial quantities of heat are applied to the rim 10. However, such heat is removed by the cooling liquid circulated through the lubricating passages within the roller 10. Specifically, liquid is introduced through the intake line 50, the head structure 86 and tube 92 to the axial bore 94 in the roller. From the outlet of the tube 92, liquid is prevented from flowing directly to the exhaust line 52 by the seal 96. Therefore, the fluid flows through a radially-extending passage 106 defined in the axle 60 to the bearing 68. The bearing 68 defines lubricating ports 108 and 110 which, along with ports 112 through the flange 64, permit the liquid to return to the axial bore through another radial passage 114, somewhat adjacent to the head structure 86. The various ports and passages through which the cooling lubricant flows are shown aligned, which would not likely be the case in actual practice. However, this deviation from actual practice has been employed to illustrate the flow pattern of the liquid coolant which is also illustrated by FIG. 3.

Upon returning to the central bore 94 through the radial passage 114, the circulating fluid is exhausted through a passage 98 as previously described which is defined between the exterior of the tube 92 and the walls of axial bore 94. The exhaust flow pattern is then through the head coupling 88, including the radial bore 100, to the line 52 which carries the fluid to the external circulating system.

In the use of the system hereof, it has been found desirable to maintain the pressure of the cooling lubricant within the roller 10 at a relatively low level. That is, as the flow rate may tend to be related somewhat to the internal pressure and chambers, it has been found desirable to operate the system at pressure levels below 40 p.s.i. inside the roller 10.

It has also been found desirable in many instances to employ the normal lubricant for the roller 10 as the liquid coolant of the circulating system. That is, normally, rollers as disclosed herein are lubricated by any of a variety of common lubricating oils. Such oils have been found effective coolants for the system hereof, with no danger of contaminating the interior cavities of the roller 10. In other instances, as where a plurality of arcs are employed simultaneously, it may be desirable to utilize a coolant with greater capacity. In this regard, a mixture of approximately 10% machine cutting oil, dispersed in water has been found particularly effective. Indications are that at least between 7% and 30% (by volume) water-dispersible oil should be used in the coolant with water.

Recapitulating, an illustrative form of the process hereof may be summarizer as follows. The sub-assembly S (FIG. 1) is mounted for convenient access to each of the rollers R. Next, the drive unit 36 is coupled to one of the rollers 10 through a capstan 84 (FIG. 2) in frictional engagement with the rim 56. Next, the arc welding apparatus W is prepared for operation with the wire guide 26 (FIG. 2) positioned in welding relationship with the worn surface 104. Thereafter, the oil plug (not shown) normally positioned in the port 90 of the roller 10 is removed and replaced by the head structure 88, carefully fitting the tube 92 into the central bore 94 with the seal 96 in sealing relationship. Of course, the order in which these preparatory operations are performed is somewhat insignificant; however, when all are accomplished, the process hereof is performed by revolving the rim 56 while simultaneously depositing hard metal by welding, and furthermore circulating fluid coolant through the interior lubricating passages of the roller. As a result, the heat of the electric arc is carried off by the cooling liquid in sufficient quantities to avoid overheating any of the elements of the roller 10 with the result that the roller remains fully operative and aligned with its components in close-tolerance relationship.

When the desired re-building operation is accomplished, the head structure 86 is removed from the port 90, the sealing plug is replaced, leaving the internal passages of the roller 10 substantially filled with lubricating oil, prepared for a long interval of operation. In the event that a foreign coolant is employed, e.g. an oil and water mix, the interior of the roller must be flushed and re-charged with lubricant. Specifically, it has been found desirable to circulate a solvent through the flow path, then disconnect the system and re-charge the interior with fluid lubricant.

The system hereof has been illustrated and described with reference to a particular form of workpiece and in a particular embodiment. However, it will be readily apparent to those skilled in the art that the disclosed system may be readily adapted in a variety of forms and for use in cooperation with a variety of workpieces. Therefore, the scope hereof is not to be limited by the illustrative disclosure, but rather shall be interpreted in accordance with the following claims.

What is claimed is:

1. An apparatus for depositing metal by arc welding on a workpiece, which workpiece includes an external rim and a cooperating internal structure which are not disassembled during the welding operation wherein a plurality of interconnected lubricant passages are defined by and between said rim and said internal structure, comprising:
   means for providing coolant under the force of pressure to one of said lubricant passages during the welding operation;
   means for forcing said coolant to flow through another of said lubricant passages whereby to establish a continuous flow of coolant through said passages between said rim and said internal structure in said workpiece so as to prevent heat distortion of the workpiece during the welding operation;
   arc welding apparatus for depositing metal on the exterior of said rim of said workpiece;
   metal supply means for supplying a substantially continuous flow of weld wire to said arc welding apparatus; and drive means for rotatably displacing said rim relative to said internal structure at a substantially uniform rate, as metal is deposited upon the exterior of said rim.

2. An apparatus according to claim 1 wherein said means for providing coolant and said means for withdrawing coolant comprise means defining a pair of concentric passages adapted to be coupled to said lubricant passages.

3. A structure according to claim 2 wherein said means defining concentric passages further includes a seal for cooperation with said workpiece to block direct fluid flow between said concentric passages.

4. A structure according to claim 1 wherein said welding means further includes means for dispensing pulverized flux to submerge the welding arc.

5. An apparatus according to claim 1 wherein said means for moving said rim relative said welding apparatus comprises means for defining a closed circular loop pattern of motion therebetween.

6. A method of arc welding hard-surface metal on a workpiece which workpiece includes an external rim and a cooperating internal structure which are not disassembled during the welding operation wherein a plurality of interconnected lubricant spaces are defined between and by said rim and said internal structure, comprising the steps of:

supplying coolant under the force of pressure to one of said lubricant spaces during the welding operation;

directing the flow of said coolant by removing coolant from another of said lubricant passages to thereby establish a continuous flow of said coolant within said workpiece through said spaces between said external rim and said external structure so as to prevent heat distortion of the workpiece during the welding operation;

substantially continuously feeding at least one electrically-energizer wire electrode to said arc established on the exterior of said rim of said workpiece to thereby deposit metal; and substantially continuously revolving said rim relative to said electrode and said internal structure, coincident with the feed of said wire electrode whereby to rebuild said external rim.

7. A process according to claim 6 wherein said coolant comprises substantially water.

8. A process according to claim 6 further characterized by the step of supplying granular flux to said arc whereby to preserve said arc submerged.

9. A process according to claim 6 further characterized by moving said workpiece relative to said arc whereby to deposit metal in a closed spiral pattern.

10. A process according to claim 6 wherein said coolant comprises a mixture of oil dispersed in water wherein the oil comprises at least 7% of the mixture by volume.

References Cited

UNITED STATES PATENTS

| | | | |
|---|---|---|---|
| 2,996,602 | 8/1961 | Webb | 219—69 |
| 3,024,349 | 3/1962 | Hinrichsen et al. | 219—76 |
| 3,089,945 | 5/1963 | Connoy et al. | 219—76 |
| 3,109,918 | 11/1963 | King | 219—76 |
| 3,139,510 | 6/1964 | Marion | 219—76 |
| 3,305,663 | 2/1967 | Janssen | 219—159 |

JOSEPH V. TRUHE, Primary Examiner

W. D. BROOKS, Assistant Examiner

U.S. Cl. X.R.

219—137